United States Patent
Coleman

(10) Patent No.: US 12,163,253 B2
(45) Date of Patent: Dec. 10, 2024

(54) DECORTICATOR AND DECORTICATING PROCESS

(71) Applicant: DEFUGO TECHNOLOGIES PTE LTD, Singapore (SG)

(72) Inventor: David Coleman, Singapore (SG)

(73) Assignee: DEFUGO TECHOLOGIES PTE LTD, Singapore (SG)

( * ) Notice: Subject to any disclaimer, the term of this patent is extended or adjusted under 35 U.S.C. 154(b) by 0 days.

(21) Appl. No.: 17/773,419

(22) PCT Filed: Dec. 3, 2021

(86) PCT No.: PCT/IB2021/061272
§ 371 (c)(1),
(2) Date: Jun. 9, 2022

(87) PCT Pub. No.: WO2022/118265
PCT Pub. Date: Jun. 9, 2022

(65) Prior Publication Data
US 2024/0183077 A1    Jun. 6, 2024

(30) Foreign Application Priority Data

Dec. 3, 2020    (AU) .............................. 2020904477
Aug. 24, 2021    (AU) .............................. 2021221469

(51) Int. Cl.
*D01B 1/22*    (2006.01)
*D01B 1/36*    (2006.01)
(Continued)

(52) U.S. Cl.
CPC ................. *D01B 1/22* (2013.01); *D01B 1/36* (2013.01); *D01B 1/38* (2013.01); *B01D 2011/002* (2013.01); *B01D 11/0288* (2013.01)

(58) Field of Classification Search
CPC ... D01B 1/14; D01B 1/22; D01B 1/32; D01B 1/36; D01B 1/38; D01B 1/40
See application file for complete search history.

(56) References Cited

U.S. PATENT DOCUMENTS 553,034 A    1/1896    Maingot
2,706,312 A    4/1955    Bobkowicz
(Continued)

FOREIGN PATENT DOCUMENTS

DE    685925 C    *    9/1941    ............... D01B 9/00
DE    722652 C    *    7/1942    ............... D01B 1/14
(Continued)

OTHER PUBLICATIONS

Machine translation of DE 738311, retrieved 2024.*
(Continued)

*Primary Examiner* — Shaun R Hurley
(74) *Attorney, Agent, or Firm* — Buchanan Ingersoll & Rooney PC

(57) ABSTRACT

There is provided a device, process and system for decortication of biomass comprising hurd, bark and bast, such as long stalk biomass. Typically, one or more of the bark, hurd or bast generated by the decortication process or decorticator device is fed to a downstream process or downstream device such as a counter current extractor. The liquid or fibre products of decorticator, or the decorticator in combination with the counter current extractor may be further processed into their components.

16 Claims, 8 Drawing Sheets

(51) Int. Cl.
    *D01B 1/38*       (2006.01)
    *B01D 11/00*    (2006.01)
    *B01D 11/02*    (2006.01)

(56) References Cited

U.S. PATENT DOCUMENTS

| | | | | |
|---|---|---|---|---|
| 5,513,805 | A | * | 5/1996 | Fisher ................... B07B 1/20 |
| | | | | 241/73 |
| 2011/0313141 | A1 | | 12/2011 | Brooks |
| 2016/0270315 | A1 | * | 9/2016 | Paulitz ................... D01B 1/16 |

FOREIGN PATENT DOCUMENTS

| | | | | |
|---|---|---|---|---|
| DE | 470504 C | * | 8/1943 | ............... D01B 1/14 |
| DE | 738311 C | * | 8/1943 | ............... D01B 1/14 |
| EP | 2212467 B1 | | 6/2014 | |
| KR | 101950790 B1 | | 2/2019 | |
| WO | WO-9745573 A1 | * | 12/1997 | ........... A01D 45/065 |
| WO | 0020667 A1 | | 4/2000 | |
| WO | 2004088006 A1 | | 10/2004 | |
| WO | 2009064207 A2 | | 5/2009 | |
| WO | 2019071361 A1 | | 4/2019 | |

OTHER PUBLICATIONS

Machine translation of DE 722652, retrieved 2024.*
Machine translation of DE 685925, retrieved 2024.*
Machine translation of DE 470504, retrieved 2024.*
International Search Report and Written Opinion for International Application No. PCT/IB2021/061272, dated Feb. 23, 2022, 6 pages.

* cited by examiner

DECORTICATOR AND DECORTICATING PROCESS

CROSS-REFERENCE TO RELATED APPLICATIONS

This application is the U.S. National Phase of International Application No. PCT/IB2021/061272, filed Dec. 3, 2021, which claims priority to Australian Application Nos. AU 2020904477, filed Dec. 3, 2020 and AU 2021221469, filed Aug. 24, 2021 the disclosures of each of these applications being incorporated herein by reference in their entirety for all purposes.

FIELD OF INVENTION

The present invention relates to the field of decortication.

In one form, the invention relates to a decorticator device.

In another form the invention relates to a process for decorticating long stalk plants.

In one particular aspect the present invention is suitable for decorticating long stalk plants such as hemp, flax, cane, corn and bamboo.

In another aspect the present invention is suitable for generating decortication products as feedstock for down-stream processes, such as counter current extraction.

It will be convenient to hereinafter describe the invention in relation to hemp, however it should be appreciated that the present invention is not limited to that use only and can be applied to a wide range of long stalk plants. For example, the invention can be used for other woody grass stalks such as sweet sorghum or kenaf, flax, sugar cane, corn and bamboo.

BACKGROUND OF THE INVENTION

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

A decorticator is a machine for stripping the skin, bark or rind from plants, typically fibre bearing plants such as nuts, wood, plant stalks, grains. The materials stripped from the plants may be used in further processing.

Possibly the earliest known decorticator device was manufactured in Italy in from 1861 and was known as a 'scavezzatrice'. It was used for decorticating hemp, which has tough, woody stalks that are difficult to break down.

In general, modern high-speed hemp decorticators for hemp remove the tough woody interior (the hurd material), from the softer, fibrous exterior of the stalk. Decortication also generates bast, which comprises cellulosic fibres from the phloem of the stem. Most decorticators are based on mechanical application of force and used mechanisms such as roll crushers ('scutchera') and hammer mills that damage the fibre to liberate the hurd and bark.

Hurd, bark and bast can be used in various applications. Hemp fibre has been known for centuries as a useful for making commercial and industrial products, including rope, sail fabrics, textiles, clothing, shoes, food, paper, bioplastics, insulation, and biofuel. However, even though hemp stalk decortication to produce hemp fibre has been known on small and medium scale since at least the mid-19th century, large, industrial scale mechanical decortication has been difficult to achieve. This has limited the use of hemp and similar woody grasses in modern times. They have been replaced by other plant material such as cotton that is easier to process on industrial scale.

Furthermore, recent growth in the hemp industry has been driven primarily by extraction of high value hemp oil from the leaves and buds. When leaves and buds are removed for recovery of the valuable oil, the remaining biomass including fibre has been considered a waste stream. From an economic point of view the fibre is not worth processing further because existing decortication processes have small throughput and are hard to scale up.

Recently, in concert with the rise of renewable energy, alternative plant materials and carbon neutral supply chains, there has been a renewed interest in hemp and other woody grasses as a source of many potentially useful 'green' products of economic benefit.

SUMMARY OF INVENTION

An object of the present invention is to provide an improved decorticator and process of decortication that maximises the proportion of feedstock converted to useful products and minimises waste or preferably, eliminates waste.

A further object of the present invention is to provide an improved method of decortication that can provide processed feedstock for down-stream processes.

Another object of the present invention is to provide a decorticator that can process a feedstock on a large, industrial scale.

It is an object of the embodiments described herein to overcome or alleviate at least one of the above noted drawbacks of related art systems or to at least provide a useful alternative to related art systems.

In its broadest form the present invention provides a process for deriving useful products from long stalk biomass feed, the process including sizing the stalks, cutting the stalks longitudinally, removing at least part of the hurd and at least part of the bark to leave a fibrous (bast) product. In its broadest form the present invention also provides a device for carrying out the process, the device including sensors providing data for controlling the process.

In a first aspect of embodiments described herein there is provided a process for deriving useful products from biomass comprising hurd, bark and bast, the process including the steps of;
  (i) sizing long stalks of the biomass,
  (ii) cutting the stalks of biomass longitudinally,
  (iii) generating a first product comprising hurd from the biomass using a rotating cutting member,
  (iv) generating a second product comprising bark from the biomass using a rotating cutting member, and
  (v) generating a third product comprising bast.

Typically, the feedstock is detrashed prior to being fed into the above system, the trash in the form of leaves and other plant detritus may be subjected to further processing.

In a second aspect of embodiments described herein there is provided a decorticator device for deriving useful products from long stalk biomass comprising hurd, bark and bast, the device including;
- a pair of rotating sizing members adapted to size the stalks when passed therebetween,
- a cutting head for cutting the stalks of the biomass longitudinally,
- a first rotating cutting member for removing a first product comprising hurd from the biomass using a rotating cutting member,
- a second rotating cutting member for removing a second product comprising bark from the biomass, the remaining bast comprising a third product, and
- separate outlets for each of the first product, the second product and the third product.

In a third aspect of embodiments described herein there is provided a system for deriving useful products from long stalk biomass comprising hurd, bark and bast, the system comprising the process according to the present invention when used in the decorticator device of the present invention.

Typically, the rotating cutting members are wheels or rollers comprising cutting surfaces. This is substantially different to processes of the prior art that use force, such as hammer milling and grinding, followed by sieving to size, to separate components of long stalk biomass.

One or more of the bark, hurd or bast generated by the decortication process or decorticator device may be fed to a downstream device or process. The downstream processing may reduce the products of decortication into components. The components comprise a wide range of substances such as for example, high nutrition food, health products, juices, water, energy, fuels, building materials, lipids, pharmaceuticals, nutraceuticals and bioactive compounds. The consumable components may undergo further processing to provide useful dosage forms such as tablets, edible liquids, and powders. The non-consumable components may undergo further processing to provide valuable products such as synfuels.

The downstream process may for example comprise a device for counter current extraction (CCE) such as counter current diffusion extraction (dCCE). One or more of bark, hurd or bast may passed into the CCE device and subjected to counter current extraction or counter current diffusion extraction to produce liquid or fibre products.

In a fourth aspect of embodiments described herein there is provided a system for processing a feedstock, the system comprising a decorticator and a counter current extractor, wherein:
(i) the feedstock is passed through the decorticator and is separated into bast, hurd and bark; and
(ii) at least one of the bast, hurd and bark is feedstock for the counter current extractor.

Preferably the CCE is a counter current diffusion extractor

The products of the CCE device, may be fed to a variety of further devices such as, for example a press or a dryer. For example, hurd or bark emerging from the decorticator or the CCE device may be pressed, dried, and then undergo a pyrolysis step to produce one or more of tar, wood vinegar (pyroligneous acid), biodiesel, ethanol, hydrogen and biochar/graphene. The pressed dried bast is more typically stored.

Preferably the device used for CCE comprises:
- an elongate housing having an inlet adjacent a first end and an outlet adjacent a second end, the longitudinal axis of the housing being inclined upwardly from the first end to the second end;
- a rotatable screw conveyor having at least one substantially helical flight disposed within the housing and rotatable about its longitudinal axis for moving feedstock to be extracted from the inlet to the outlet;
- an inlet chamber located adjacent the inlet such that feedstock to be extracted can be introduced through the inlet to the rotatable screw conveyor;
- a means for introducing an extracting liquid into the housing such that the extracting liquid flows down the housing and in counter current with the feedstock being extracted; and
- a means for withdrawing liquid extracted from the feedstock and returning the liquid into the housing such that the returned liquid contacts the feedstock being extracted.

Sensors

The decorticator, and any downstream device such as a CCE device may include sensors. Where used herein the term 'sensor' is intended to refer to a device which detects or measures a physical property and indicates, records, transmits or otherwise responds. The sensors may be commercially available and/or customised for intended purpose.

In a preferred embodiment, "Internet of Things" (IoT) based sensors monitor the process of feedstock and products through the decorticator device. The IoT is typically a system of interrelated computing devices, mechanical and digital machines provided with unique identifiers and the ability to transfer data over a network without requiring human intervention.

The captured information may be relayed to a database server within or outside an associated processing facility. Optionally, the captured information may be used as a data reference point during "real-time process optimization".

In particular, the sensors can monitor a range of process parameters including feedstock and product volumes and flow rates at various locations in the decorticator and/or any downstream device. The sensors communicate the captured information to a database in a server preloaded with a process control program. In this manner the server can optimise the machine-readable process control program in real-time to ensure maximum productivity and minimum waste.

In particular the information from the sensors of the decorticator device or downstream device may be transferred via a secure network to a proprietary Real-Time Information System (RIMS) as depicted in FIG. 6. The RIMS is comprised of a server, database and a user interface (UI) where the captured information from the decorticator device and CCE is processed and a proprietary Efficiency Digital Algorithm calculates optimal instruction set adjustments of the pre-defined settings of process program that have been sent to a central processing unit (CPU).

In a preferred embodiment of the system of the present invention, the sensors communicate detected feedstock information and decorticator information via a secure private wireless network to a Sensor Network Monitoring Database (SNMD). This database sits in an electronic data warehouse comprising both a Relational Database Management System (RDBMS) and NoSQL databases. The data warehouse and supporting AI application algorithm programs make up the Real-Time Information Management System (RIMS) of the present invention.

The data detected by the sensor network is communicated to the SNMD for the purpose of real-time updating of the appropriate software and/or generating a response that optimises of the preloaded processing programs for the specific batches of feedstock moving through the process of the present invention.

The RIMS comprises a hybrid data warehouse of relational databases that typically retrieves and saves data in a structured format, using rows and columns. There may also be NoSQL ("non-SQL" or "non-relational") databases that are non-tabular, and store data differently than relational tables, such as by storing structured, semi-structured, and unstructured data. NoSQL databases are preferred when dealing with AI applications and huge volumes of data. The flexibility of the data warehouse allows the RIMS system response to be extremely efficient and effective for storing the different data sets that contribute to RIMS.

The RIMS may also include an AI Application Stack of programs running on several servers. An application stack is a suite or set of application programs that help to perform certain tasks. These applications are closely linked together, and data can be exported or imported among them with minimum steps. A variety of programming languages may be used to optimize the process of the present invention by embedding artificial intelligence across the IoT stack whenever possible. The programs include but are not limited to parameter setting modelling of the sensor network, data tolerance setting and data connection modelling, optimized recipe modelling, and effects modelling of monitoring data and algorithms.

Each Efficiency Digital Algorithm (EDA) is itself a computer procedure, reflecting the method steps of a decortication program. The algorithm starts with inputs captured by sensors. Other inputs to the algorithms include the multiple databases within the data warehouse and outputs of the programs in the AI application stack. The EDA generates a set of outputs, which are in essence the real-time optimal instruction set adjustments of the pre-defined settings of the preloaded decortication program. The outputs generated are sent to the central processing unit (CPU) associated with the decorticator device.

The RIMS typically includes a robust decision management system including but not limited to a Sensor Network management system, RIMS user interface, digital counter current extractor CPU Master relay system and a remote RIMS management system. The generated EDA delivers the real time optimization via the CPU master relay transmission to the decorticator device onboard CPU.

Specifically, using the data captured by sensors, the process control program can control physical parameters such as the rate of rotation of the rotating cutting devices and the height of the cutting head. This allows the rate of material flow through the decorticator device to be controlled, and delivery of the exact product cut and size desired.

The process control program can ensure that the volume and rate of product flow is optimised for direct feed to any downstream process.

In a fifth aspect of embodiments described herein there is provided a system for recovery of products from a long stalk biomass feedstock, the process comprising:
  a decorticator operable to perform a number of feedstock decortication steps according to a program,
  an apparatus which is in communication with the decorticator and configured for process control of the feedstock processing steps, and
  multiple sensors associated with the decorticator and adapted to transmit decorticator information and feedstock information to the apparatus, the apparatus comprising:
  a memory unit for storing a feedstock decortication program that comprises a list of machine-readable feedstock decortication program instructions for process control of feedstock decortication steps, wherein the list of machine-readable feedstock decortication program instructions comprises command instructions that each allocates a respective feedstock decortication step to a predefined control command among a set of predefined control commands,
  an electronic warehouse comprising databases for storing the feedstock profile and feedstock information,
  a processor for performing real-time adjustment of the machine-readable feedstock decortication program instructions in response to decorticator information and feedstock information from the databases,
  wherein the decorticator information and feedstock information are input to an Efficiency Digital Algorithm for calculation of the adjustments to the machine-readable feedstock decortication instructions and optimisation of the process control command, prior to sequentially executing the machine-readable feedstock decortication program instructions in the list of instructions.

Cutting Head

The long stalks are typically cut longitudinally by a rotary cutting tool. The cutting head is typically of a type used for milling, having a circular body with multiple square teeth. The cutting head rotates at high speed, the cutting action occurring primarily at the end corners of the square teeth.

Typically, the cutting head is attached to a spindle that drives rotation of the cutting head. Alternatively, rotation of the cutting head is driven by an adjacent transport wheel that rotates simultaneously and pushes the biomass across the cutting head.

In a preferred embodiment, the spindle comprises a shaft with a quick release mechanism on the outside of the shaft that keeps the cutting head (or the transport wheel) in place and allows for them to be rotated, switched or replaced.

The quick release mechanism may be, for example, a spring clasp. Preferably the spring clasp is raised to fit neatly beside the cutting head (or transport wheel) and hold it in place. In another preferred embodiment, the quick release mechanism comprises a locking nut that is on a counter revolution thread to the direction of travel of the cutting head (or transport wheel). The locking nut would then be removed and reset with a rachet gun.

The size of the cutting head is determined by the volume of biomass being processed. As such, the size or angle of the cutting head maybe adjusted to allow more or less stalks of biomass to pass side by side over the cutting head. Corresponding adjustments are made to the size and position of the adjacent transport wheel.

Downstream Processing

The products of the device and process of the present invention may be store for later use or fed immediately to a downstream process. For example, the bast product may be fed to a process for large, industrial scale textiles production. The saw dust like hurd product may be fed to a process for extraction of sugars, cellulose, hemicellulose, lignin, proteins, oils and other valuable products. The saw dust like bark product may be fed to a process for extraction of cellulose, hemicellulose, polyphenols and lignin. The extracts in turn may be processed into biofuels, other renewable energy sources and biofertilizers like biochar.

In a particularly preferred embodiment, the products of the present invention are fed to a downstream process such as a CCE process. Counter current diffusion extractors are known in the food processing industry as continuous and stepless contacting devices in which the solid and liquid phases run counter current and are thus separated. The feedstock is typically cut or chopped into pieces of desired size prior to being introduced to the CCE device. Alternatively, or in addition, the feedstock is subjected to decortication and one or more of the resultant bark, hurd and bast is introduced to the CCE device.

Liquid/Solid Separation

The combination of the decorticator of the present invention and a CCE device facilitates liquid/solid separation from the bark, hurd or bast.

Solid/Fibre Separation

The combination of the decorticator of the present invention and a CCE device is also advantageous for the separation of solids or fibre. FIG. 9 is a flow chart illustrating the use of the CCE in the process for separation of liquid from fibre followed by recombination to produce targeted products. The feedstock is subjected to decortication, and or more products of decortication (bark, hurd or bast) may be fed into the CCE device.

The next step is dewatering using a belt press (also known as a belt press filter). In a preferred embodiment, feedstock pieces comprising the fibre is transferred from the dCCE to a holding tank. The feedstock pieces are fed in a controlled manner from the holding tank in between two moving belts of filter cloths. Liquid is extracted initially by gravity, then by squeezing as the filter cloths pass around rollers. The liquid exits through a port and is returned to the dCCE. The fibre is scraped off the filter cloths and then transferred to a mix tank where it is either mixed with a desired volume of liquid for brix manipulation or it is left as zero sugar (brix).

The ability to manipulate component sugar content to a desired target outcome is a key differentiator for the present inventive process since methods of the prior art typically produce fibre with approximately 5° brix. Wet fibre may then be pasteurized before bulk aseptic packaging. Alternatively, fibre may be moved to a drier, and the dry fibre either bulk packaged or milled. Dry fibre is a valuable product used as a dietary supplement or nutritional supplements, particularly to fortify food products.

In a particularly preferred embodiment, the decorticator device and process of the present invention provides products suitable for use downstream as feedstock for the CCE and associated process described in the International Patent Application corresponding to Australian Provisional Patent Application No. 2020904315 to Defugo Group Australia Pty Ltd the disclosures of which are incorporated herein by reference.

Optimally, the information captured by the sensors associated with the decorticator device may be used for "real-time" process optimization to ensure that product of optimal size is provided at optimal rate to the CCE. This contributes to maximizing productivity and minimising waste.

The information from the sensors of the decorticator device may be transferred via a secure network to a proprietary Real-Time Information System (RIMS) which is also used for process control of the CCE. The RIMS is comprised of a server, database and a user interface (UI) where the captured information from the decorticator device and CCE is processed and a proprietary Efficiency Digital Algorithm calculates optimal instruction set adjustments of the pre-defined settings of process program that have been sent to a central processing unit (CPU).

In yet a sixth aspect of embodiments described herein there is provided the abovementioned system for recovery of products from a long stalk biomass feedstock, wherein the system further comprises a CCE which receives one or more products from the decorticator as CCE feedstock for CCE processing, the CCE having multiple sensors adapted to transmit CCE information and CCE feedstock information, and wherein the decorticator information and CCE information are transmitted as input to an Efficiency Digital Algorithm for calculation of the adjustments to the machine-readable feedstock decortication instructions and CCE processing and optimisation of the process control command, prior to sequentially executing the machine-readable feedstock decortication program instructions and CCE processing instructions in the list of instructions.

Other aspects and preferred forms are disclosed in the specification and/or defined in the appended claims, forming a part of the description of the invention.

In essence, embodiments of the present invention stem from the realization that precision cutting using industrial scale machinery can be more effectively used to process long stalk biomass, compared to prior art methods using separation by force, such as hammer milling. Furthermore, by utilising information from sensors, a process control program can control and optimise the process performance and characteristics of the products.

Advantages provided by the present invention comprise the following:
the decorticator device is simple in construction and operation, highly reliable and simple to service;
the decorticator can accept long stalk biomass feedstock from any type of long stalk biomass harvesting method (manual or automated).
the device and process can be scaled up for industrial processing of large quantities of long stalk biomass,
the device and process provide substantial output volumes of several high-value products with minimal, or preferably negligible waste,
the process products can be used as a feed for downstream processing,
the device can be used on a wide range of long stalk plants.
improved economy of scale.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which.

| Table of Parts (FIG. 1) | | | |
|---|---|---|---|
| 1 | Funnel chute | 2 | Sizing wheels |
| 3 | Gripping area | 4 | Cutting knife |
| | | 6 | First guide wheel |
| 7 | Inner passage | 8 | Second guide wheel |
| | | 10 | First cutting wheel |
| 11 | First transport wheel | 12 | Second cutting wheel |
| 13 | Second transport wheel | | |
| 15 | Housing | 16 | Pivot |
| 17 | Frame | | |
| 21 | First sensor | 22 | Second sensor |
| 23 | Third sensor | 24 | Fourth sensor |
| 25 | Fifth sensor | 26 | Sixth sensor |
| 27 | Seventh sensor | 28 | Eighth sensor |
| 29 | Nineth sensor | 30 | Tenth sensor |
| 31 | Eleventh sensor | 32 | Twelfth sensor |
| 33 | Thirteenth sensor | 34 | Fourteenth sensor |
| 35 | Fifteenth sensor | 36 | Sixteenth sensor |
| 37 | Seventeenth sensor | | |

| Table of Parts (FIG. 7) | | | |
|---|---|---|---|
| 41 | Airlock Chamber | 42 | Sealable hinged lids |
| 43 | Motors and instruments | 44 | (internal) Screen support attached to CCE Shaft |
| 5 | Ball valves from header pipe to jacket | 46 | Lifting lug for cranes |
| 47 | Discharge port in front of internal screen | 48 | Recycle juice heat exchanger inlet |
| 49 | Hot water jacket on trough body | 50 | CCE removable and adjustable cutting head to single screw blade |
| 51 | Adjustable diffusion spaced entry point | 52 | Rails for moving cutter into place |
| 53 | Adjustable diffusion spaced entry point | 54 | Hot water or steam header pipe for jacket panels |
| 55 | CCE vacuum enablement for terpene recovery | 56 | Enlarged solids discharge point |
| 57 | Double actuating ram to open the CCE | 58 | Hydraulic lift agitation control unit |
| 59 | External bearing | 60 | Double gate valve hydraulic pneumatic discharge point |
| 61 | Triclamp for temperature probe to measure solvent temperature | 62 | Fibre cutting unit (for preparing fibre for a subsequent processing stage) |

DETAILED DESCRIPTION

Figure 1:
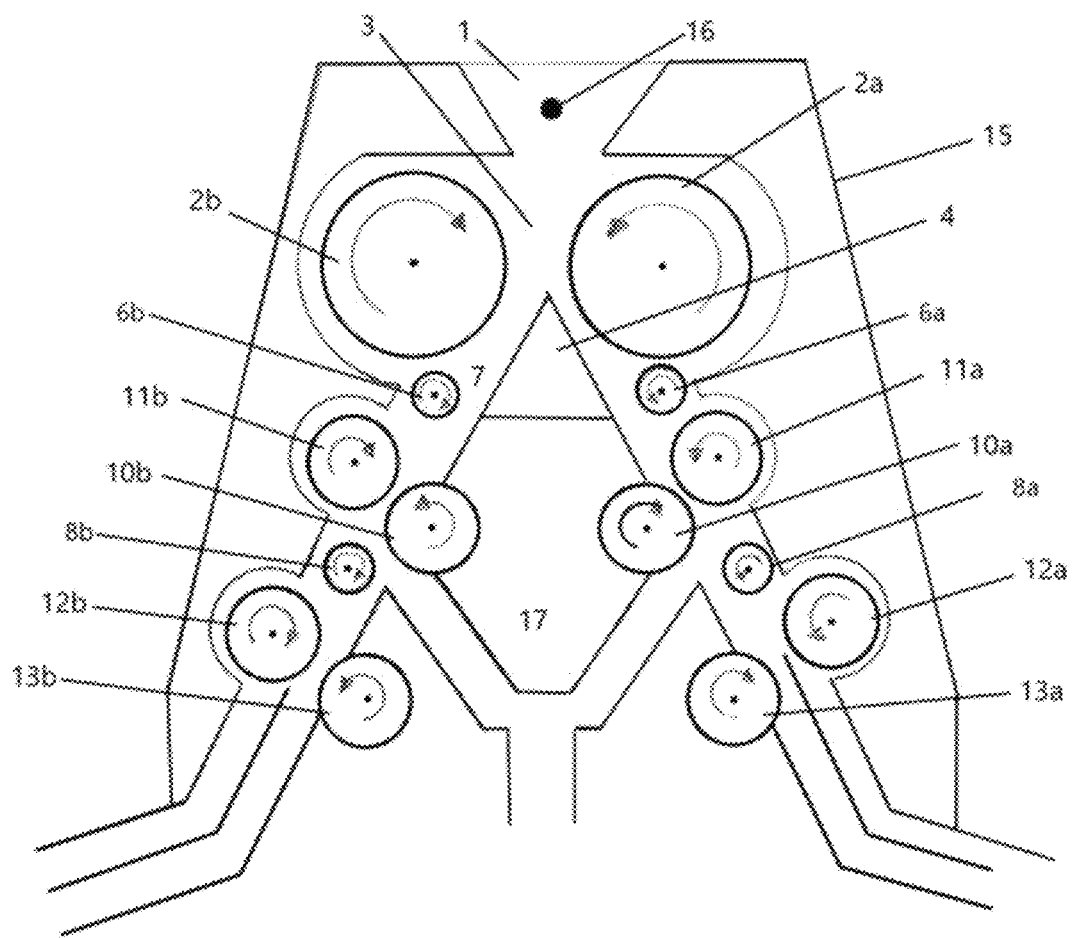
FIG. 1 is a plan diagram illustrating one embodiment of a decorticator according to the present invention.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

The decortication process and device of the present invention can be readily configured to provide products that are in a form that is suitable for specific applications. For example, long stalk biomass such as hemp can be processed by the decorticator device to provide a product that at one extreme has the consistency of fine saw dust, or at the other extreme, comprises long fibre strands of desired length.

Preliminary Stage

As an initial step, long stalk biomass feed is cut to the desired bast fibre (stalk) length. The cut stalks may be sorted so that stalks of similar diameter are fed into a decorticator device to ensure optimal cutting accuracy and product yield. Preferably, multiple decortication machines are used, each processing stalks of predetermined length and diameter.

FIG. 1 is a plan diagram illustrating one embodiment of a decorticator according to the present invention.

The long stalk biomass is gravity fed into the decorticator through a funneled chute (1) that puts the stalks of the biomass feed into longitudinal alignment so that the stalks "pin drop".

The long stalks of biomass drop into a gripping area (3) between a pair of sizing wheels (2) that grip and squeeze the biomass feed stalks to a consistent predetermined diameter. The direction of rotation of the sizing wheels (2) are indicated by the curved arrows. The rotation of the sizing wheels (2) pushes the sized biomass feed at speed over a cutting head (4) attached to an inner frame (17) of the decorticator.

The cutting head (4) cuts the biomass feed stalks longitudinally, typically into two half stalks. The two halves of each travel down either side of the cutting head (4), guided by the inner passage (7) and first guide wheels (6). The direction of rotation of the first guide wheels (6) are indicated by the curved arrows. The biomass feed is thus guided into the first stage of decortication. The biomass feed continues down each side of the decorticator in 'mirror image' fashion.

1st Stage of Decortication

Figure 3:
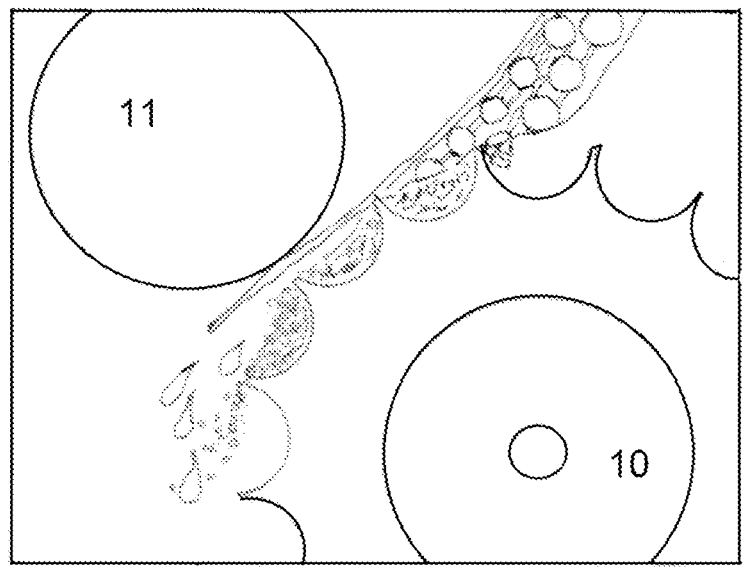
FIG. 3 illustrates one embodiment of a cutting wheel and adjacent transport wheel suitable for use in the decorticator of FIG. 1.
Figure 4:
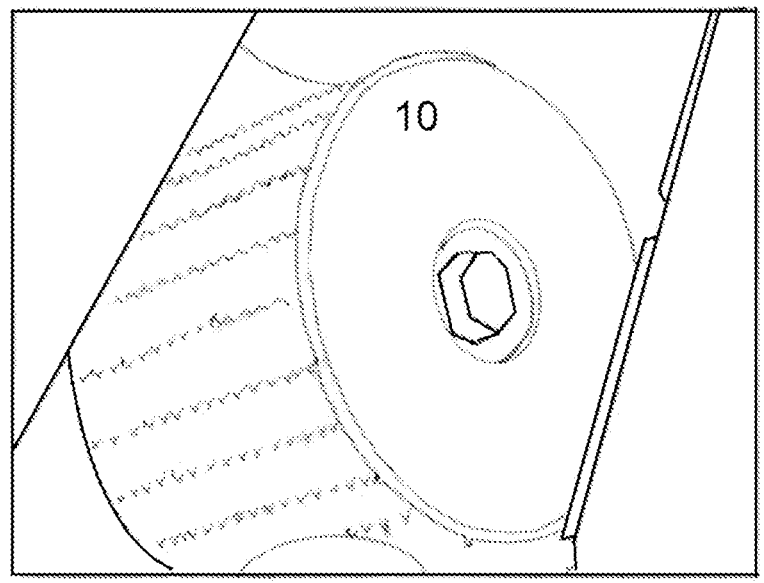
FIG. 4 illustrates the cutting wheel of FIG. 3 in perspective view.
Figure 5:
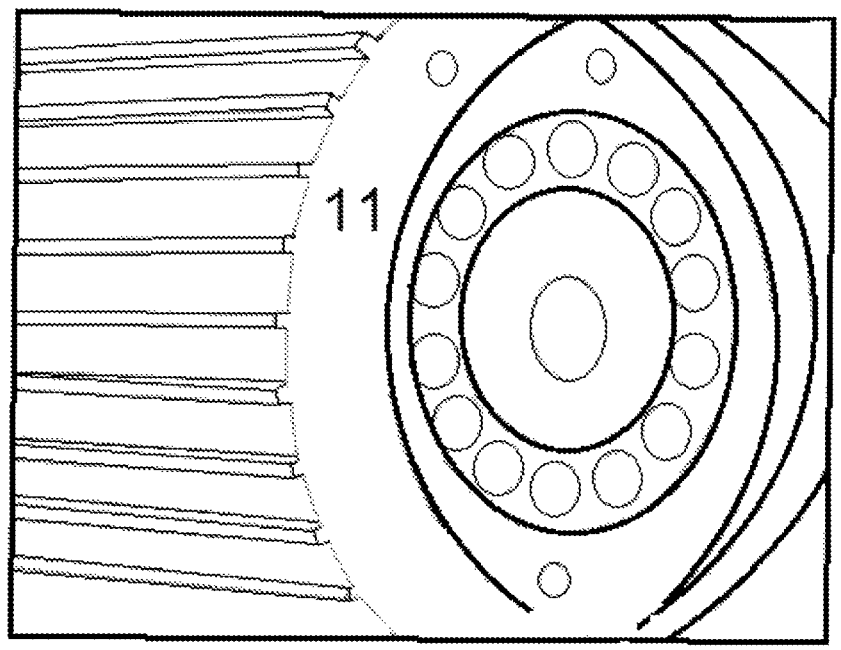
FIG. 5 illustrates a transport wheel of FIG. 3 in perspective view.

The first stage of decortication removes the hurd, or woody interior of the stalks. The biomass feed is then passed into the gap between a transport wheel (11) and adjacent cutting wheel (10). FIG. 3 depicts the transport wheel (11) and adjacent cutting wheel (10) in plan view, showing the biomass feed passing through the gap. Perspective views of the cutting wheel (10) and transport wheel (11) are shown in FIG. 4 and FIG. 5 respectively.

The direction of rotation of the cutting wheels (10) and the transport wheel (11) are indicated by the curved arrows. The transport wheel (11) rotates slower than the cutting wheel (10) and thus grips the outer bark layer of the biomass feed stalks. The cutting wheel (10) removes the hurd on the underside of the biomass feed stalks. The size of the gap between the transport wheel (11) and the cutting wheel (10) dictates the proportion of hurd that is removed or remains on the outer bark layer of the biomass feed stalks.

The hurd that has been removed, is finely divided particulate matter that resembles saw dust and falls down an exit pipe to a conveyor belt (not shown). The hurd can be stored or fed directly to a downstream process (discussed below).

2nd Stage of Decortication

The biomass feed (minus at least part of the hurd) from the 1st stage of decortication, resembles long strips, and continues to the 2nd stage of decortication. The second stage targets the outer epidermal bark later for removal.

The biomass feed is passed into the gap between a second transport wheel (13) and adjacent second cutting wheel (12). The direction of rotation of the transport wheel (13) and second cutting wheel (12) are indicated by the curved arrows. The second cutting wheel (12) rotates in the opposite direction to the first cutting wheel (10). Similarly, the second transport wheel (13) rotates in the opposite direction to the first transport wheel (11). The bark that is removed looks like sawdust and is extracted from the spinning second cutting wheel (12) by a pressurised stream of water or air. The bark falls down an exit pipe and onto a conveyor belt (not shown). The bark can be stored, or fed directly to a downstream process (as discussed below).

Emerging from this processing is the bast, which looks like long fibrous straps. The bast product is pushed along an exit pipe.

In a preferred embodiment, the outer casing (15) of the decorticator is designed in a Gull wing configuration that fits over the transport wheels and cutting wheels with a central pivot pin (16) at the top. The housing (15) can be rotated or pivoted about the pivot pin (16) to provide access to the interior of the decorticator for maintenance, safety inspections and configuration changes for new biomass processing, such as changing of the cutting head (4). The cutting head (4), cutting wheels (10, 12) and transport wheels (11, 13) are attached to an inner frame (17) of the decorticator which houses motors for rotating the wheels and gives the stability to the unit. All moving parts such as the cutting knife (4) and transport wheels (11, 13) are removably attached to this frame. In a preferred embodiment the cutting knife (4) and transport wheels (11, 13) are "clipped on" to the inner frame (17) for easy removal for servicing and configuration changes.

Sensors

Figure 2:
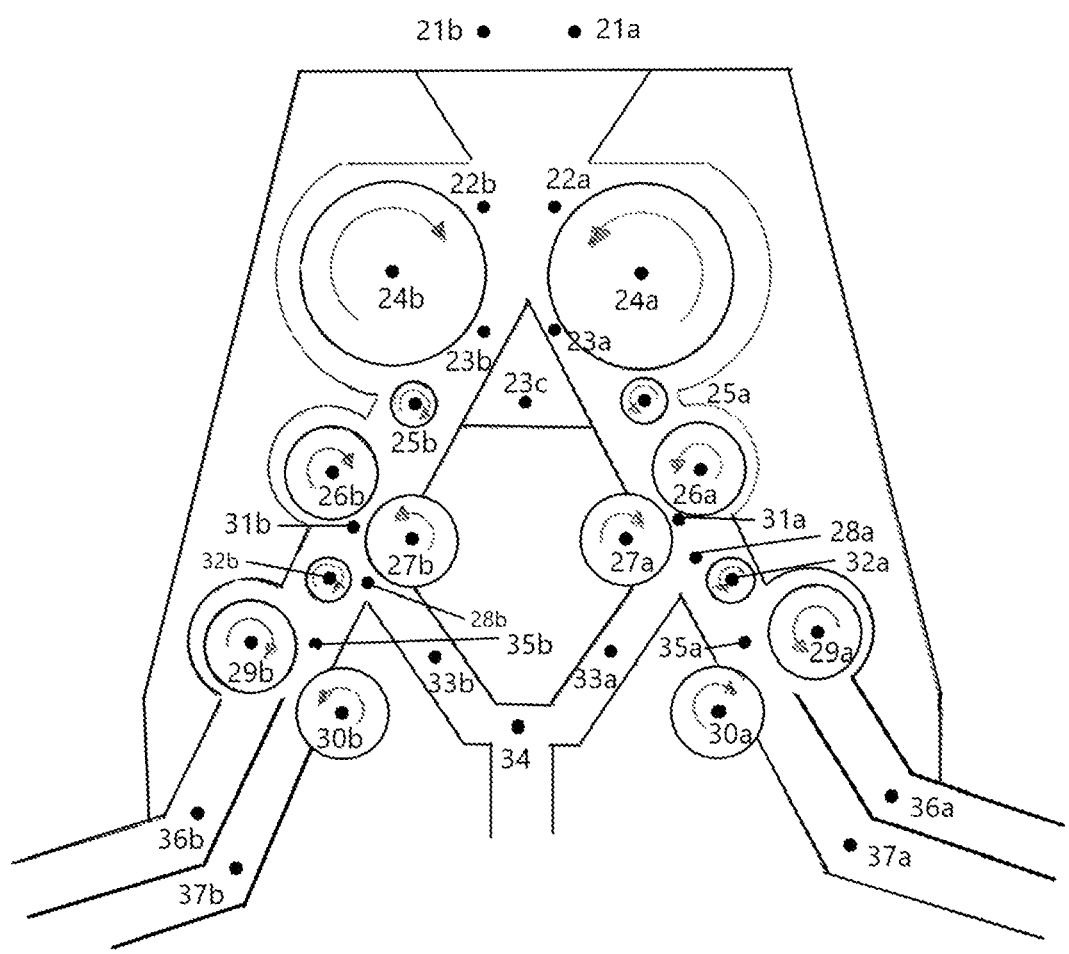
FIG. 2 illustrates the location of sensors in the decorticator of FIG. 1.

FIG. 2 illustrates the position of the various IoT sensors located in the decorticator device of the present invention for monitoring the process of feedstock and products.

The sensors indicated in FIG. 2 and the parameters they typically measure are listed as follows:

First sensors (21a,21b)—These sensors measure the flow and biomass size, such as the diameter of the biomass stalks as they enter the chute (1) of the device;

Second sensors (22a,22b)—These sensors measure the flow of biomass stalks and the width of the gap between sizing wheels (2a,2b) in the gripping area (3). Based on measurement by the sensors (21a,21b), the width of the gap is automatically adjusted, relative to the size of biomass;

Third sensors (23a,23b,23c)—These sensors measure the height and position of the tip of the cutting head (4) relative to the centre point of two adjacent sizing wheels (2a,2b). This ensures that the biomass stalks hit the cutting head square-on and are separated into two halves that are substantially symmetrical;

Fourth sensors (24a,24b)—These sensors measure the speed of rotation of the sizing wheels (2a,2b). The rate of feed of the biomass stalks is adjusted based on the measurement from these sensors;

Fifth sensors (25a,25b)—These sensors measure the speed of rotation of the first guide wheels (6a,6b) moving biomass towards the cutting wheels (10a, 10b);

Sixth sensors (26a,26b)—These sensors measure the speed of rotation of the transport wheels (11a, 11b) to ensure that the biomass is held for a sufficient amount of time adjacent the first cutting wheels (10a, 10b) to create the first product while ensuring that the biomass still keeps moving through the machine;

Seventh sensors (27a,27b)—These sensors measure the speed of rotation of the first cutting wheels (10a, 10b), and the degree of resistance to gauge whether the desired amount of bark has been removed. The transport wheels (11a, 11b)) rotates slower than their respective first cutting wheels (10a, 10b) and thus grips the outer bark layer of the biomass feed stalks, hence the data from the sensors is used to adjust the relative speeds. These measurements also provide data to indicate when the first cutting wheels (10a, 10b) need to be changed.

Eighth sensors (28a,28b)—These sensors measure the flow of first product comprising hurd that is generated from the cutting wheels (10a, 10b). The sensors (28a,28b) may also measure the pressure or volume of water or air that is applied to urge the biomass product through the machine;

Ninth sensors (29a,29b)—These sensors measure the speed of rotation of the second transport wheels (13a, 13b) to ensure that the biomass is held for a sufficient amount of time adjacent the second cutting wheel (12a,12b) to create the second product comprising bark;

Tenth sensors (30a,30b)—These sensors measure the speed of rotation of the second cutting wheels (12a, 12b), and the degree of resistance to gauge whether the desired amount of bark has been removed. These measurements also provide data to indicate when the cutting wheels (12a, 12b) need to be changed;

Eleventh sensors (31a, 31b)—These sensors measure the rate of biomass flow from the first cutting wheels (10a, 10b) towards the second cutting wheels (12a, 12b). Based on data measured by these sensors, the gap between the second cutting wheels (12a, 12b) and the second transport wheels (13a, 13b) is adjusted to achieve the desired removal of biomass as a second product. The flow data measured by the sensors also indicates any incidences of biomass jamming in the conduit;

Twelfth sensors (32a,32b)—These sensors measure the speed of rotation of the second guide wheels (8a,8b) moving biomass towards the second cutting wheels (12, 12b);

Thirteenth sensors (33a,33b)—These sensors measure the flow of first product as it is removed from the first cutting wheels (10a, 10b) and falls down the exit pipe towards a conveyor belt;

Fourteenth sensor (34)—This sensor measures the speed of the conveyor (or any other device used to remove the first product from the machine). The sensor also measures the weight of first product passing onto the conveyor. This data is used to manage and optimise the 2nd stage processing rates;

Fifteenth sensor (35a,35b)—These sensors measure the flow rate of biomass in the 2nd stage. Data from these sensors is used to adjust the gap between the second cutting wheels (12a, 12b) and the second transport wheels (13a, 13b) to achieve the desired rate of removal of second product. The flow data measured by the sensors also indicates any incidences of biomass jams.

Sixteenth sensor (36a,36b)—These sensor measure flow rate and weight of the second product. The sensors also measure the volume and pressure of air or water that is applied to assist flow of the second product through the conduits.

Seventeenth sensor (37a,37b)—These sensors measure flow rate and weight of the third product. The sensors also measure the volume and pressure of air or water that is applied to assist flow of the second product through the conduits.

The sensors communicate the captured information to a database in a server preloaded with a process control program. Optionally, the captured information may be used as a data reference point during "real-time" process optimization using the program. In this manner the server can optimise the machine readable process control program in real-time to ensure maximum productivity and minimum waste.

The information from the sensors may be transferred via a secure network to a proprietary Real-Time Information System (RIMS). The RIMS is comprised of a server, database and a user interface where the captured information is processed and a proprietary Efficiency Digital Algorithm calculates optimal instruction set adjustments of the pre-defined settings of the process program that has been sent to a CPU.

Specifically, the process control program can control the rate of rotation of the wheels shown in FIG. 1 and the height of the cutting head (4). For example, to maximise the biomass feed stock flow, the rotational speed of the sizing wheels (2) and the first guide wheels (6) can be adjusted. This allows the rate of material flow through the decorticator device to be controlled, and delivery of product of desired cut and size.

The process control program can ensure that the volume and rate of product flow is optimised for direct feed to any downstream process.

Cutting Head

The cutting head (4) is attached to an inner frame (17) of the decorticator by a quick release mechanism that permits rapid replacement of the cutting head without undue delay to operation of the decorticator device. The cutting head (4) is attached at the apex of a pyramidal section of the frame.

Typically, the cutting head is attached to a spindle that drives rotation of the cutting head. Alternatively, rotation of the cutting head is driven by an adjacent transport wheel that simultaneously rotates to push the biomass across the cutting head.

In a preferred embodiment, the spindle comprises a shaft with a quick release mechanism on the outside of the shaft so that the cutting head can be rapidly rotated, switched or replaced. The quick release mechanism may be, for example, a spring clasp or locking nut that is on a counter revolution thread to the direction of travel of the cutting head.

The size of the cutting head is determined by the volume of biomass being processed. As such, the size or angle of the cutting head maybe adjusted to allow more or less stalks of biomass to pass side by side over the cutting head. Corresponding adjustments are made to the size and position of the adjacent transport wheel.

Downstream Processing

The hurd, bark and fibre (bast) products of long stalk biomass may be stored for later use or immediately fed to a downstream process to create other products.

Typically, the bast may be used for processing into textiles on any convenient scale.

The saw dust like hurd may be a feedstock for a downstream process to extract products such as sugars, cellulose, hemicellulose, lignin, proteins, oils and other valuable products.

The saw dust like bark may be a feedstock for a process to extract products such as cellulose, hemicellulose, polyphenols and lignin. These products can be further processed to produce biofuels, biodiesel, bio-aviation gas, ethanol and other renewable energy sources, pharmaceuticals/nutraceuticals and biofertilizers like biochar.

Other useful products include cattle feed, building materials such as hempcrete, graphene and nanocellulose.

Figure 7:
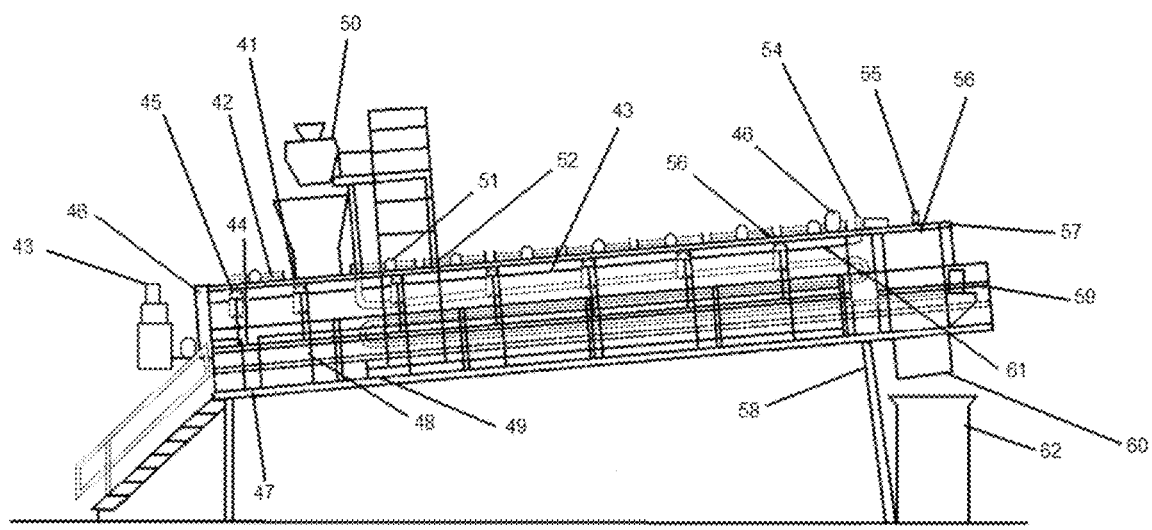
FIG. 7 illustrates a single screw, dCCE equipped with an airlock chamber and suitable for use in the present invention.

In a particularly preferred embodiment, the products of the present invention are fed to a downstream process such as a CCE, such as by using a CCE device. A counter current diffusion extractor according to the present invention is depicted in FIG. 7. CCE devices are commonly known in the industry as continuously operating and stepless contacting devices in which solid and liquid phases run counter current and are thus separated. The feedstock is typically cut or chopped into pieces of desired size prior to being introduced to the CCE device. Liquid extracted from the feedstock is reintroduced to the device to provide the liquid counter current.

In a preferred embodiment the hurd or bark product of the process of the present invention is added to enzyme/balance tanks in preparation for CCE.

The hurd or bark product can be processed "wet", that is, water and water premixed with enzymes can be sprayed on the material to help with transportation into the CCE device.

In a particularly preferred embodiment, the decorticator device and process of the present invention provides products suitable for use downstream as feedstock for the CCE device and associated process described in the International Patent Application corresponding to Australian Provisional Patent Application No. 2020904315 to Defugo Group Australia Pty Ltd the disclosures of which are incorporated herein by reference.

Optimally, the information captured by the sensors associated with the decorticator device may be used for "real-time" process optimization as described above, to ensure that product of optimal size is provided at optimal rate to the CCE device. This contributes to maximizing um productivity and minimising waste.

Figure 6:
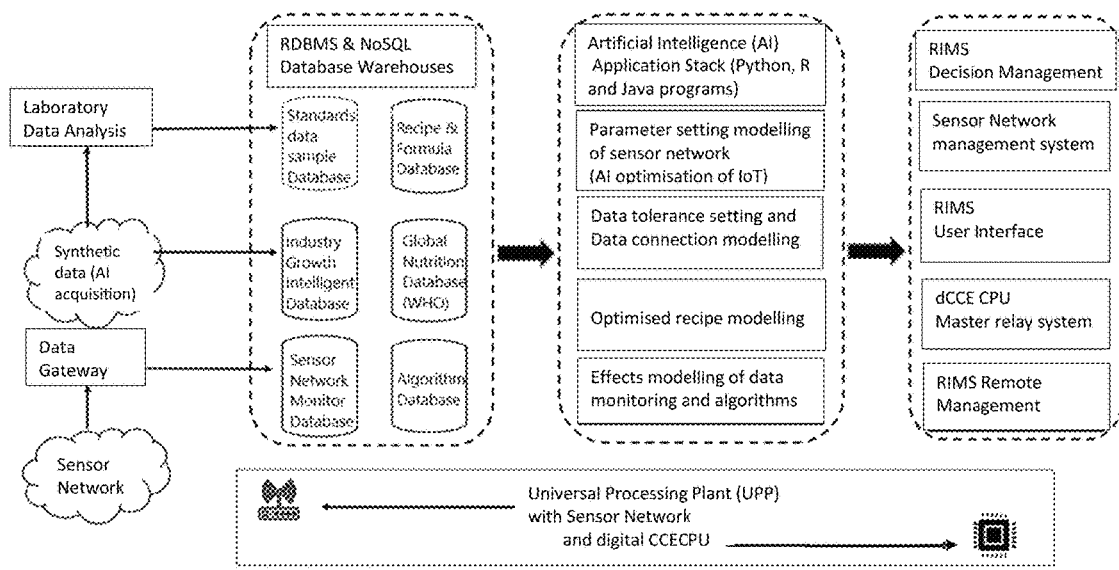
FIG. 6 illustrates the architecture of the system of the present invention, depicting the basic components and subsystems that work together to implement the overall processing system including a sensor network and dCCE CPU.

As also described above, the information from the sensors of the decorticator device may be transferred via a secure network to a proprietary RIMS which is also used for the CCE. FIG. 6 depicts the high level architecture of a suitable system. The RIMS is comprised of a server, database and a user interface where the captured information from the decorticator device and CCE is processed and a proprietary Efficiency Digital Algorithm calculates optimal instruction set adjustments of the pre-defined settings of process program that have been sent to a CPU.

The decorticator device and process of the present invention can provide substantial output volumes of several high-value products with minimal, or preferably negligible waste. This greatly increases cash yields per ton of hemp. More significantly it enables large quantities of biomass to be processed, moving the hemp industry and other similar industries into direct competition with other textile materials such as cotton.

This is important generally, but more specifically it is of importance to the many countries in which water is a major issue. Cotton processing consumes huge quantities of water with concomitant damage to the environment.

Many long stalk biomass crops such as hemp are rapidly growing grasses that can be easily incorporated into existing agriculture. In particular they can replace or provide rotational options alongside slower growing crops like sugarcane.

The decorticator device and process of the present invention creates a significant economic opportunity by enabling multiple revenues streams from a single crop.

The present invention will be further described with reference to the following non-limiting Examples:

Example 1—Sugar Cane Feedstock Processing

In the present example the feedstock comprises sugarcane. This example illustrates the separation of sugarcane biomass into valuable components such a (i) sucrose and (ii) bioenergy in the form of biofuels.

Initial Processing

Sugar cane is brought to the processing plant. If necessary, prior to transport to receiving bins, the billets are passed through a detrashing unit to remove leaf matter and loose organic matter, which may be subjected to further processing.

If necessary, the cane is conveyed from the detrashing unit to a washing station where dirt and other undesirable matter is washed from the outside of the cane. This maintains the quality of the processed material.

If the long stalk biomass in the form of cane stalks (billets) have not been cut to a desired length in the cane field they are cut to a desired length at the processing plant.

Cane Decortication

The typical next step in processing is decortication which separates the billets into three component parts, namely;
- bark (2 wt %) which can be used as feedstock for extraction of tricin, and the extraction of other bioactive and waxes,
- hurd (80 wt %) which can be used as a feedstock for recovery of sugar and dietary fibre components, and
- bast (18 wt %) which can be used as the feedstock for recovery of cellulose and lignin for downstream energy generation.

FIG. 1 illustrates one embodiment of a decorticator suitable for use according to the present invention. While the use of the decorticator is described with respect to sugar cane billets, it will be appreciated that the decorticator is suitable for use more generally with a wide range of plant biomass, typically in the form of long stalk plants.

The long stalk biomass is gravity fed into the decorticator through the funneled chute (1) so that the stalks 'pin drop' into the gripping area (3) between the pair of sizing wheels (2). The rotation of the sizing wheels (2) pushes the sized biomass feed at speed over a cutting head (4) that cuts the biomass feed stalks longitudinally. The two halves travel down either side of the cutting head (4), guided by the inner passage (7) and first guide wheels (6).

1st Stage of Decortication

The first stage of decortication removes the hurd, or woody interior of the stalks. The biomass feed is then passed into the gap between a transport wheel (11) and adjacent cutting wheel (10) where the cutting wheel (10) removes the hurd on the underside of the biomass feed stalks.

The hurd that has been removed, is in the form of finely divided particulate matter that resembles saw dust and falls down an exit pipe to a conveyor belt (not shown). The hurd can be stored or fed directly to a downstream process (discussed below).

2nd Stage of Decortication

The biomass feed (minus at least part of the hurd) is passed into the gap between a second transport wheel (13) and adjacent second cutting wheel (12). The bark that is removed looks like sawdust and is extracted from the spinning second cutting wheel (12) by a pressurised stream of water or air. The bark falls down an exit pipe and onto a conveyor belt (not shown). The bark can be stored or fed directly to a downstream process (as discussed below).

Emerging from this processing is the bast, which is pushed along an exit pipe.

Sugar Extraction from Hurd

The hurd generated from decortication may be fed into the CCE device such as depicted in FIG. 7 where sugar is extracted using hot water as the diffusion liquid. The extracted sugar syrup has a Brix value of 10-11 and is subsequently passed through a vibrating sieve having a 0.5 mm screen to filter out larger solids.

Microfiltration

Microfiltration using 0.1 mm filter removes smaller solids and bacteria in the extract. The extracted sugar syrup can be sent for processing using a prior art sugar evaporator and crystallized to produce a superior plantation (unrefined) sugar. This simple process has the advantage that unlike conventional processes, it does not use any chemicals or other agents to clean or whiten the crystallized sugar.

If it is desired to further extract polyphenols and minerals from the sugar solution then the following steps may be utilised:

Ultrafiltration

Ultrafiltration can be used to remove the polyphenolic compounds and most of the extracted mineral salts from the retentate solution from the microfiltration. This provides a concentrate of polyphenols and minerals that can be further refined to make other products. The filtered extract can, from this stage, either be concentrated through evaporation and left as sugar syrup or used to produce sugar crystals.

Ion Exchange

An ion exchange process may optionally be used to further reduce any colour in the sugar solution. Ion exchange equipment such as resin exchange columns are well known in the art and can readily be included in a processing plant according to the present invention. Dark coloured polyphenolic compounds may be selectively removed by binding to a polymer exchange resin to produce a lighter product of superior appearance.

An evaporator is another device that is well known in the art and can be readily included in a processing plant. An evaporator creates conditions in which the sugar syrup can be crystallised by water evaporation from the syrup, typically to a level of greater than 70 brix. Water from the evaporation process can be recovered and used as a beverage, a beverage mixer or returned to the CCE for further sugar extraction.

Fiber from Hurd

Extracted fibre will exit the top of the CCE and pass into a cutting head such as a Comitrol® brand cutting head. The gauge on this cutting head may be set as required, such as to a desired fiber length.

The collected extracted fibre comprising approximately 85% moisture may be pumped into a balance tank, and then to a belt press where it is compressed to reduce the moisture level to approximately 70-75 wt %. The recovered water may be returned to the CCE device.

The pressed fibre can be fed to a rotary kiln dryer for further drying. Once dried to a moisture level of less than about 8%, the fibre can be milled and bagged. The water removed during drying, can be condensed and returned to the CCE, used in the plant for cleaning, or deployed for other uses such as agriculture or further processing after which it can be used for human or animal consumption.

Bark Processing

Bark processing is typically only used to target the recovery of specific products in the skin of the plant. If only sugar recovery is desired, or sugar and cogen energy, then it is not necessary to remove bark from the bast. Bark processing is an expensive process and is only economically viable for recovery of high value products, some of which are described in the following paragraphs.

Solvent Extraction Using Ethanol in CCE

Bark may be extracted in a CCE unit that is designed to be spark and flash proof. This is necessary because the extraction diffusion liquid comprises ethanol diluted to 18% in water in order to extract bioactives in the skin that are not water soluble. These include tricin, polyphenols and lipids in the bark that have considerable commercial value. The extract is screened through a 1 mm sieve to remove larger solids.

An evaporator is used to remove the ethanol and water to concentrate the bioactive compounds in the extract. The water and ethanol removed by evaporation can be condensed and used for other purposes.

Both the hurd and the bark are suitable for processing into energy after the extraction of sugar from the hurd and polyphenols from the bark. For example, the hurd and bark biomass may be processed into pellets and then dried to the desired moisture content. As illustrated in the process steps shown in FIG. 8 the recovered fibre may be processed into pellets, dried and then used to produce gas for power generation. High temperature pyrolysis of the dried pellets forms a syngas rich in hydrogen and carbon monoxide which is then filtered. Biochar and graphene are produced by pyrolysis of the biomass and are removed and can be used for purposes such as soil amendment.

Bast & Bark Processing for Energy

The above described process can also be used for bast and bark, or bast alone. The bast is typically cutter to a desired length and processed into dried pellets for conversion in the reaction steps illustrated in FIG. 8. If there is need to dry the biomass further it can be put into long term storage before processing.

The removal of the bark is preferred to avoid extraction of waxes that can cause undesirable by-products in the process. As the waxes do have commercial value, they are considered a waste stream if their removal is required.

The biomass is moved to balance tanks where an enzyme is added to further 'loosen' the targets in the fiber. Liquid targets are lignin and cellulose for the creation of bioethanol, fibers for pyrolysis to create biodiesel, wood vinegar, biochar and thermal energy. The balance tanks steady the rate of feed of the biomass into the CCE device where the fibers are separated from the lignin and cellulose materials.

Liquids

The liquid stream is a mix of cellulose, lignin and water. The liquid passes through a coarse filter to remove any expired enzymes, before the water is separated from the lignin and the cellulose using any convenient means, such as centrifuging or membrane filtration. Depending on whether ethanol is desired, the mixed stream can directly be fed to a process, or the liquid is separated into a lignin and cellulose stream for further refining into ethanol/bioenergy.

Example 2-Hemp/Kenaf Processing

In the present example the feedstock comprises a high fibre product such as hemp or kenaf. This example illustrates the separation of hemp or kenaf biomass into valuable components such a (i) energy in the form of biofuels, (ii) cotton alternatives and (iii) plant based proteins for human or animal consumption.

Initial Processing

Hemp stalk is brought to the processing plant. If the stalks have not been cut to a desired length in the cane field, they are cut to a desired length at the processing plant.

If necessary, prior to transport to receiving bins, the stalks are passed through a detrashing unit to remove leaf matter and loose organic matter, which is passed into a separate process for second stage re-use in animal feed.

If necessary, the stalks are conveyed from the detrashing unit to a washing station where dirt and other undesirable matter is washed from the outside of the stalks. This maintains the quality of the processed material.

Stalk Decortication

The stalks are accelerated through the decorticator to split the stalk into 3 different parts, namely;
  2 wt % bark (which is removed from the bast is if the bast needs to be of high purity) and is used in producing energy or for the extraction of high end bioactives,
  60-70 wt % hurd which contains short fibre, the majority of the lignin and lower cellulose and is used for bonding in hempcrete, and for energy production, and
  30-40 wt % bast which has the majority of long fibre strands is high in cellulose, low in lignin and is used primarily for textiles and energy production.

Hurd Processing

If energy is the only desired output from the hurd then the removed material is moved to a pelletising unit and then a drying unit where the moisture will be reduced to 14%. The pellets can then be used for energy generation as illustrated in FIG. 11.

Alternatively, if the hurd is to be subjected to extraction, it is sent on conveyor belts to the CCE device and extracted using hot or cold water as the diffusion liquid. The extracted liquid may contain cellulose, lignin, starch, proteins and sugars.

Secondary processing of these extracts can be based on the desired economic outcome such as liquid starches, proteins, sugars and energy conversions for the cellulose and lignin.

Fiber Processing

The extracted fibre described above can exit the top of the CCE and be fed into a belt press for moisture removal. The extracted fibre is approximately 85% moisture and may be pressed to reduce the moisture content to approximately 70-75%. The recovered water can be returned to the CCE.

The pressed fibre may be pelletized and sent for further drying. Once dried to a moisture level of 14% moisture, the fibre can be stored for later energy conversion. The water removed by the drying, can be condensed and reused in the CCE, used in the processing plant for cleaning, or deployed for other uses including agriculture.

Bark Processing

Bark processing is only required when specific high value polyphenol products in the skin of the plant are desired, or for cleaning the bast for conversion to textiles. If energy recovery is the sole target, then bark is not required to be removed from the bast. This is an expensive process and is only worthwhile for recovery of high value products.

Solvent Extraction Using Ethanol in CCE

The bark layer is extracted in a CCE device that is designed to be spark and flash proof due to the use of flammable extraction diffusion liquid, such as 18% aqueous ethanol solution. Ethanol is used to extract the bioactives in the bark that are not water soluble such as tricin and other lipids that have considerable commercial value. The extract is screened through a 1 mm sieve before being concentrated in the evaporator.

An evaporator is used to remove the solvent and to concentrate the bioactive compounds in the extract. The solvent can be retrieved and reused. The concentrate is then sent for further extraction of the relevant bioactives.

The remaining fibre is pressed and pelletized and dried to 14% moisture for storage. It may be used for example, in the energy conversion process illustrated in FIG. 8.

Bast Processing for Textiles:

Regardless of whether the bark is removed by the decorticator, processing of the bast is the same as described above. The bast is cut to a length suitable for the CCE device in which it is to be processed, and to achieve the desired length of processed fibres. The cut bast is then moved to a ballast tank containing an enzyme to help loosen the fibres and degum the bast. The type of enzyme will be determined by the amount of extraction required and the optimal amount of breakdown of the fibre strands. As they pass through the CCE the fibre strands loosen and release a liquid stream containing cellulose, lignin, sugars and starches. These extracts can be moved to secondary separation processes and processes for conversion to energy.

Liquids

The liquid stream is a mix of cellulose, lignin, starch and water. The liquid is passed through a course filter to remove any expired enzymes, before the water is separated from the lignin and the cellulose using any convenient means, such as centrifuging or membrane filtration. Depending on whether the generation of ethanol is desired either the mixed stream can be processed, or the liquid can be separated into a lignin and cellulose stream for further refining into ethanol/bioenergy.

Once removed from the end of the CCE, the fibres are ready for drying and processing into alternative cotton, paper, cardboard or any number of textile based materials.

Bast Processing for Energy

Regardless of whether the hurd is removed from the bast by the decorticator, processing of the bast is the same as described above. The bast is cut to the desired length and dried to 14% moisture for storage and conversion to energy.

Pelletized Biomass for Energy Conversion

Figure 8:
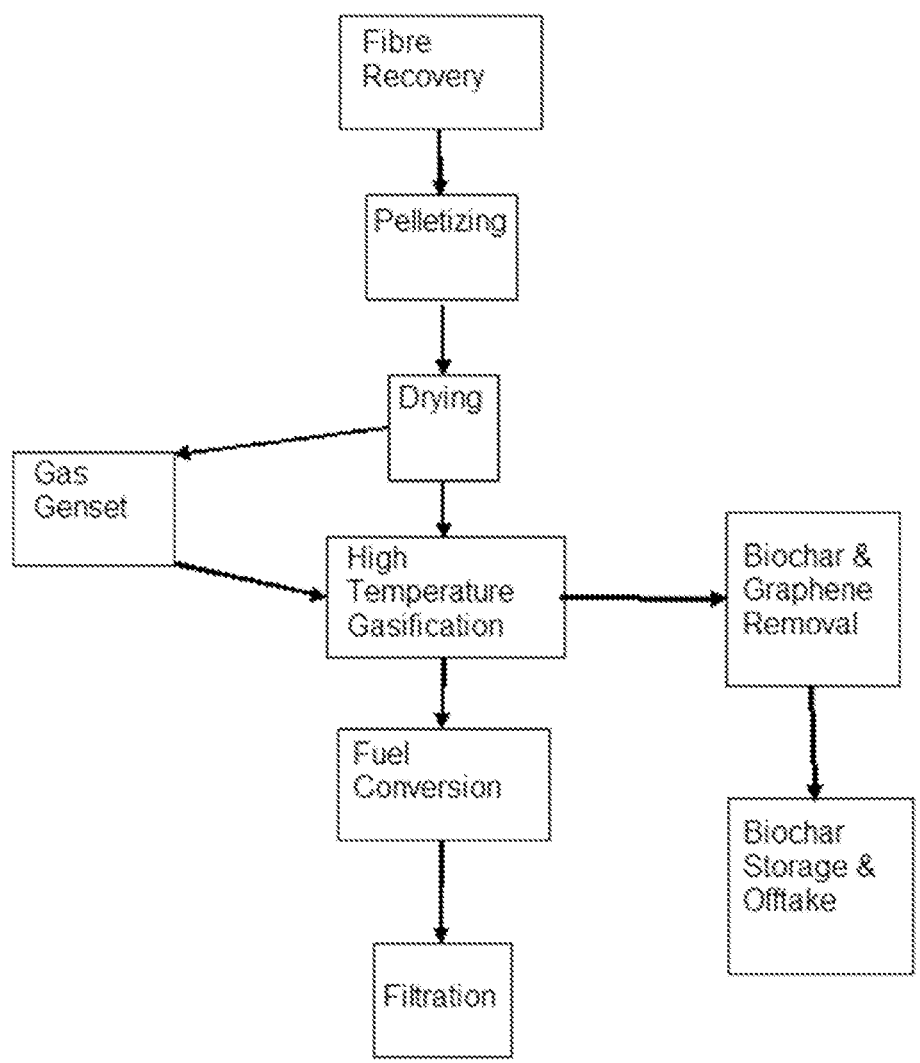
FIG. 8 is a flow chart illustrating the use of fibre, produced by any of the processes disclosed herein, as feedstock for the production of energy and synthetic fuel.

The pelletized biomass is optimally feed in a system such as the system depicted in FIG. 8. The biomass can be converted, for example, into:

renewable fuels-such as diesel, avgas, ethanol and hydrogen biochar/graphene pyroligneous Acid water In general, the pelletized biomass may be used in most types of prior art pyrolysis processes, with varying degrees of yield and product quality.

Liquid Conversion to Energy

Various other valuable products in the biomass can be extracted (such as by using CCE) or separated (such as by using decortication) before the biomass is turned into energy. One of the advantages of the process of the present invention is that it provides biomass-to-energy conversion without the need for removal of undesirable by-products or impurities to improve the biomass conversion. This is true for a wide range of biomass feedstocks including sugarcane, and oils derived from feedstocks such as palms.

DISCUSSION OF THE EXAMPLES

The Examples illustrate an embodiment of the invention in which a decorticator and/or counter current extraction device can be used for isolating products from a feedstock.

With particular reference to Example 1 and Example 2, the present invention provides a system for processing a feedstock comprising the steps of:

(i) passing the feedstock through a decorticator to separate the feedstock into bast, hurd and bark;

(ii) further individually processing at least one of the bast, hurd and bark in a counter current extractor, wherein the bast is pressed, dried and stored, and/or wherein the hurd and/or bark is pressed, dried and pyrolyzed to produce one or more of tar, wood vinegar (pyroligneous acid), hydrogen and biochar.

Figure 9:
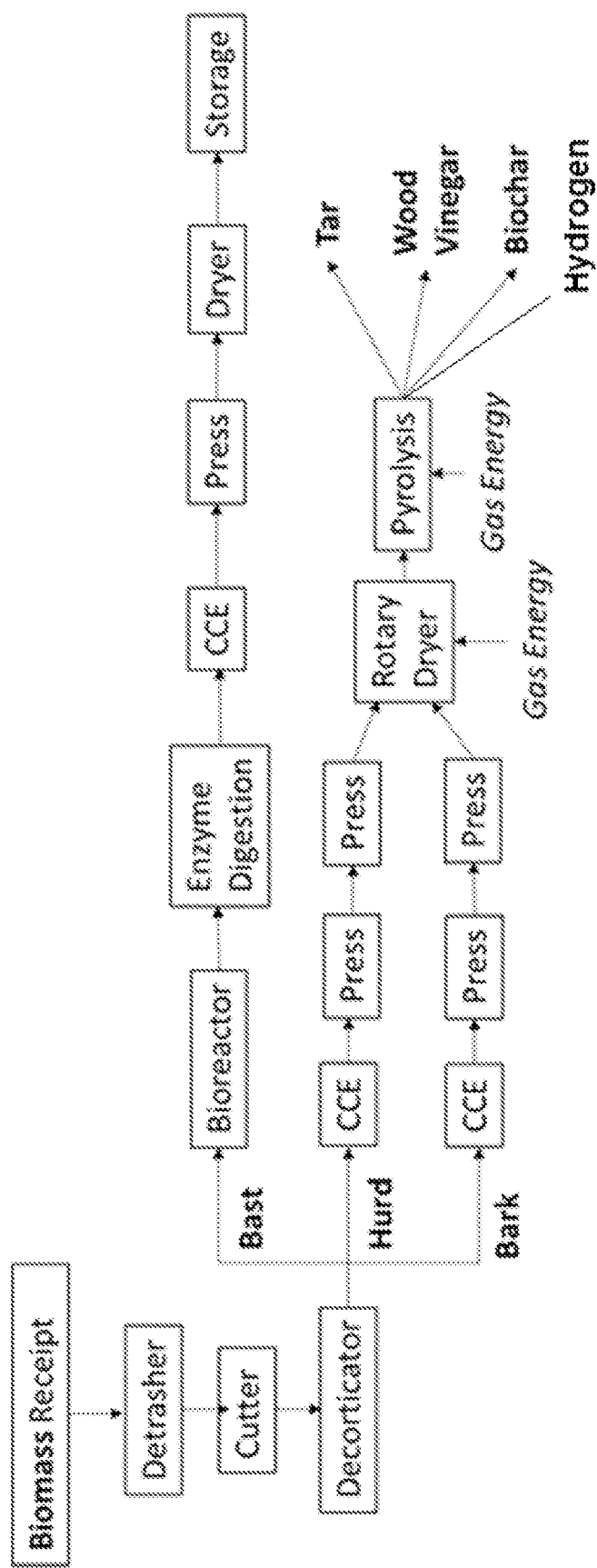
FIG. 9 is a flow chart illustrating a further embodiment of a process according to the present invention for processing a feedstock to separate or extract products.

This system is described in more detail in FIG. 9, including steps intermediate to counter current extraction and decortication.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plusfunction clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

It should be noted that where the terms 'server', 'secure server' or similar terms are used herein, a communication device is described that may be used in a communication system, unless the context otherwise requires, and should not be construed to limit the present invention to any particular communication device type. Thus, a communication device may include, without limitation, a bridge, router, bridge-router (router), switch, node, or other communication device, which may or may not be secure.

It should also be noted that where a flowchart is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the invention may be embodied in many different forms, including computer program logic for use with a processor (e.g., a microprocessor, microcontroller, digital signal processor, or general purpose computer and for that matter, any commercial processor may be used to implement the embodiments of the invention either as a single processor, serial or parallel set of processors in the system and, as such, examples of commercial processors include, but are not limited to Merced™, Pentium™, Pentium II™, Xeon™, Celeron™, Pentium Pro™, Efficeon™, Athlon™, AMD™ and the like), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML. Moreover, there are hundreds of available computer languages that may be used to implement embodiments of the invention, among the more common being Ada; Algol; APL; awk; Basic; C; C++; Conol; Delphi; Eiffel; Euphoria; Forth; Fortran; HTML; Icon; Java; Javascript; Lisp; Logo; Mathematica; MatLab; Miranda; Modula-2; Oberon; Pascal; Perl; PL/I; Prolog; Python; Rexx; SAS; Scheme; sed; Simula; Smalltalk; Snobol; SQL; Visual Basic; Visual C++; Linux and XML.) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g, a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL). Hardware logic may also be incorporated into display screens for implementing embodiments of the invention and which may be segmented display screens, analogue display screens, digital display screens, CRTs, LED screens, Plasma screens, liquid crystal diode screen, and the like.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

When a Markush group or other grouping is used herein, all individual members of the group and all combinations and sub-combinations possible of the group members are intended to be individually included in the disclosure. Every combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. The broad term "comprising" is intended to encompass the narrower "consisting essentially of" and the even narrower "consisting of." Thus, in any recitation herein of a phrase "comprising one or more claim element" (e.g., "comprising A), the phrase is intended to encompass the narrower, for example, "consisting essentially of A" and "consisting of A." Thus, the broader word "comprising" is intended to provide specific support in each use herein for either "consisting essentially of" or "consisting of." The invention illustratively described herein suitably may be practiced in the absence of any element or elements, limitation or limitations which is not specifically disclosed herein.

One of ordinary skill in the art will appreciate that materials and methods, other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by examples, preferred embodiments and optional features, modification and variation of the concepts herein disclosed may be resorted to by those skilled in the art, and that such modifications and variations are considered to be within the scope of this invention as defined by the appended claims.

Each reference cited herein is incorporated by reference herein in their entirety. Such references may provide sources of materials; alternative materials, details of methods, as well as additional uses of the invention.

The invention claimed is:

1. A process for deriving useful products from biomass comprising hurd, bark and bast, the process including the steps of;
   (i) sizing long stalks of the biomass,
   (ii) cutting the stalks of biomass longitudinally,
   (iii) generating a first product comprising hurd from the biomass using a rotating cutting member,
   (iv) generating a second product comprising bark from the biomass using a rotating cutting member, and
   (v) generating a third product comprising bast.

2. The process of claim 1, wherein the long stalk biomass is selected from the group consisting of: sugar cane, sweet sorghum, kenaf, flax, corn and bamboo.

3. A decorticator for deriving useful products from long stalk biomass comprising hurd, bark and bast, the device including;
   a pair of rotating sizing members adapted to size the stalks when passed therebetween,
   a cutting head for cutting the stalks of the biomass longitudinally,
   a first rotating cutting member for removing a first product comprising hurd from the biomass,
   a second rotating cutting member for removing a second product comprising bark from the biomass, wherein a remaining third product comprises bast, and
   separate outlets for each of the first product, the second product and the third product.

4. A process for deriving useful products from long stalk biomass comprising hurd, bark and bast, the process comprising the steps of:
   (a) providing the decorticator of claim 3;
   (b) sizing long stalks of the biomass;
   (c) cutting the stalks of biomass longitudinally;
   (d) generating a first product comprising hurd from the biomass using the first rotating cutting member;
   (e) generating a second product comprising bark from the biomass using the second rotating cutting member, and
   (f) generating a third product comprising bast.

5. The process according to claim 4 wherein hurd or bark emerging from the decorticator device is pressed, dried, and pyrolyzed to produce one or more of tar, wood vinegar, biodiesel, ethanol, hydrogen and biochar/graphene.

6. The process according to claim 4, wherein the long stalk biomass feedstock is selected from the group consisting of: sugar cane, sweet sorghum, kenaf, flax, corn and bamboo.

7. A system for processing a feedstock, the system comprising a decorticator according to claim 3 and a counter current extractor, wherein the counter current extractor is configured to receive at least one of the bast, hurd, or bark from the decorticator.

8. The system according to claim 7, further comprising a press and a dryer configured for pressing and drying bark or hurd from the decorticator or counter current extractor.

9. A process for processing a feedstock, comprising the steps of:
   (a) providing the system of claim 5;
   (b) passing the feedstock through the decorticator and separating the feedstock into bast, hurd and bark; and
   (c) using at least one of the bast, hurd and bark as feedstock for the counter current extractor.

10. The process of claim 9, further comprising providing a press and a dryer, wherein bark or hurd from the decorticator or counter current extractor is pressed and dried.

11. The process of claim 10, further comprising pressing, drying, and pyrolyzing hurd or bark emerging from the counter current extractor to produce one or more of tar, wood vinegar, biodiesel, ethanol, hydrogen and biochar/graphene.

12. A system for recovery of products from a long stalk biomass feedstock, the system comprising:
- a decorticator according to claim 3 operable to perform a number of feedstock decortication steps according to a program,
- an apparatus which is in communication with the decorticator and configured for process control of the feedstock processing steps, and
- multiple sensors associated with the decorticator and adapted to transmit decorticator information and feedstock information to the apparatus,
- the apparatus comprising:
- a memory unit storing a feedstock decortication program that comprises a list of machine-readable feedstock decortication program instructions for process control of feedstock decortication steps, wherein the list of machine-readable feedstock decortication program instructions comprises process control command instructions that each allocates a respective feedstock decortication step to a predefined control command among a set of predefined control commands,
- an electronic warehouse comprising databases for storing the feedstock profile and feedstock information,
- a processor for performing real-time adjustments of the machine-readable feedstock decortication program instructions in response to decorticator information and feedstock information from the databases,
- wherein the processor is configured to process the decorticator information and feedstock information as inputs to an efficiency digital algorithm for calculation of the real-time adjustments to the machine-readable feedstock decortication instructions and optimization of the process control command instructions, prior to sequentially executing the machine-readable feedstock decortication program instructions in the list of instructions.

13. The system according to claim 12,
- wherein the system further comprises a counter current extractor configured to receive one or more products from the decorticator as counter current extractor feedstock for counter current extractor processing, the counter current extractor having multiple sensors adapted to transmit counter current extractor information and counter current extractor feedstock information to the processor;
- wherein the list of machine-readable feedstock decortication program instructions further includes counter current extractor processing instructions and associated process control command instructions; and
- wherein the processor is configured to process the decorticator information and counter current extractor information as inputs to the efficiency digital algorithm, wherein the efficiency digital algorithm is further configured for calculation of adjustments to the counter current extractor processing instructions and optimization of the set of process control command instructions, prior to sequentially executing the machine-readable feedstock decortication program instructions and counter current extractor processing instructions in the list of instructions.

14. The system according to claim 13 wherein the counter current extractor is a counter current diffusion extractor.

15. The system according to claim 13, wherein the long stalk biomass feedstock is selected from the group consisting of: sugar cane, sweet sorghum, kenaf, flax, corn and bamboo.

16. The system according to claim 12, wherein the long stalk biomass feedstock is selected from the group consisting of: sugar cane, sweet sorghum, kenaf, flax, corn and bamboo.

* * * * *